: 3,844,984
CRYSTALLINE COPOLYMERS OF CIS-1,4-DIHALO-2,3-EPOXYBUTANE
Edwin James Vandenberg, Wilmington, Del., assignor to Hercules Incorporated, Wilmington, Del.
No Drawing. Filed Dec. 12, 1972, Ser. No. 314,288
Int. Cl. C08g 23/02
U.S. Cl. 260—2 A        5 Claims

ABSTRACT OF THE DISCLOSURE

High molecular weight crystalline copolymers of cis-1,4-dihalo-2,3-epoxybutane and a small amount of a halogen-free comonomer which is polymerizable by a cationic mechanism are described. Specific comonomers include vinyl alkyl ethers, cyclic oxides, lactones and 2-oxazolines.

---

This invention relates to crystalline polymeric epoxides and more particularly to high molecular weight crystalline copolymers of a cis-1,4-dihalo-2,3-epoxybutane with a small amount of a halogen-free comonomer which is polymerizable by a cationic mechanism.

Crystalline homopolymers of cis-1,4-dihalo-2,3-epoxybutanes are known and described in U.S. Pat. 3,065,188. The homopolymers are racemic diisotactic polymers with dd–dd and ll–ll carbon sequences and find use in both plastic and wax applications. The high molecular weight homopolymers can be fabricated into films, fibers and molded articles, particularly where solvent resistance and flame resistance are desired. The homopolymers, however, crystallize so readily from the melt, especially during drawing to make oriented fiber or film, that optimum strength properties cannot be realized.

Now, in accordance with this invention it has been found that the rate of crystallization of polymers of cis-1,4-dihalo-2,3-epoxybutane can be lowered without significant detriment to the other desirable properties of the polymers by including a small amount of certain halogen-free comonomers which are polymerizable by a cationic mechanism in the polymer, and that the copolymers so produced give fibers and film of improved strength properties due to better orientation during drawing. Additionally, the products from these copolymers have greater utility, especially as flame resistant oriented fibers, films, bottles and the like.

Accordingly, the present invention relates to a crystalline copolymer of a cis-1,4-dihalo-2,3-epoxybutane and from about 0.5 to about 15 weight percent, preferably from about 1 to about 10 weight percent, of at least one halogen-free monomer which is copolymerizable with said epoxybutane by a cationic mechanism and is selected from the group consisting of (a) monomers of the formula

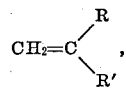

where R is an alkyl, aryl or alkaryl group, R' is a hydrogen or R, with the proviso that when R' is hydrogen, R is aryl or alkaryl and that when R and R' are each alkyl they can together form a carbocyclic structure, (b) monomers of the formula $CH_2=CHOR^2$ where $R^2$ is alkyl, (c) cyclic oxides containing from 3 to 5 members in the ring, (d) cyclic esters containing from 4 to 7 members in the ring, and (e) 2-oxazolines.

Any cis-1,4-dihalo-2,3-epoxybutane wherein both halogens are the same can be copolymerized with the above monomers to produce the new crystalline copolymers of this invention. Thus, cis-1,4-difluoro-, dichloro-, dibromo- or diiodo-2,3-epoxybutanes can be copolymerized to yield crystalline copolymers.

The monomers which are copolymerizable by a cationic mechanism with a cis-1,4-dihalo-2,3-epoxybutane in small amounts to give the copolymers of the invention are, as stated, halogen free and compounds of the formula

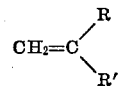

or $CH_2=CHOR^2$ (where R, R' and $R^2$ are as set forth above), cyclic oxides containing from 3 to 5 members in the ring, cyclic esters containing from 4 to 7 members in the ring or 2-oxazolines. Preferred compounds of the formula

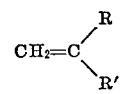

include compounds wherein R and/or R' are alkyl groups containing 1 to 10 carbon atoms, aryl groups containing 6 to 12 carbon atoms and alkaryl groups containing 7 to 30 carbon atoms. Typical halogen-free compounds of this type include isobutylene, styrene, α-methyl styrene, p-methyl styrene, p-methyl-α-methyl styrene, and β-pinene. Preferred compounds of the formula $CH_2=CHOR^2$ are the vinyl alkyl ethers where $R^2$ is an alkyl group containing 1 to 10 carbon atoms and preferably a lower alkyl containing 1 to 6 carbon atoms.

The cyclic oxides which are copolymerizable by a cationic mechanism with a cis-1,4-dihalo-2,3-epoxybutane in accordance with this invention are epoxides (i.e., oxiranes), oxetanes and furans.

Exemplary of epoxide comonomers are the alkylene oxides such as ethylene oxide,
propylene oxide,
1-butene oxide,
cis-2-butene oxide,
trans-2-butene oxide,
isobutylene oxide
1-hexene oxide,
and the like, the cycloaliphatic oxides such as cyclohexene oxide,
vinyl cyclohexene oxide,
α-pinene epoxide,
cyclooctene oxide,
dipentene epoxide,
and the like, arylalkylene oxides such as Styrene oxide,
and the like, alkenylalkylene oxides such as butadiene monoxide,
and the like, epoxy ethers such as alkyl glycidyl ethers, as for example, methyl glycidyl ether,
ethyl glycidyl ether,
propyl glycidyl ether,
isopropyl glycidyl ether,
t-butyl glycidyl ether,
n-hexyl glycidyl ether
n-octyl glycidyl ether,
and the like, aryl glycidyl ethers, such as > phenyl glycidyl ether,
> naphthyl glycidyl ether,
> and the like, unsaturated glycidyl ethers such as the alkenyl glycidyl ethers as for example, > vinyl glycidyl ether,
> allyl glycidyl ether,
> and the like, the alkenyl aryl glycidyl ethers such as > o-allylphenyl glycidyl ether,
> p-crothylphenyl glycidyl ether,
> and the like, the acetylenically unsaturated epoxides such as the epoxy alkynes containing 5 to 18 carbon atoms and particularly > 1,2-epoxy-4-decyne,
> 1,2-epoxy-4-hexyne,
> cis- and trans-5,6-epoxy-8-decyne,
> cis-and trans-5,6-expoxy-2,8-decadiyne
> and the like, the heterocyclic epoxides such as > 5,6-epoxy-1,3-dioxepane,
> 2-methyl-5,6-epoxy-1,3-dioxepane,
> 2-butyl-5,6-epoxy-1,3-dioxepane,
> 2,2-dimethyl-5,6-epoxy-1,3-dioxepane,
> 3,4-epoxy-tetrahydropyran,
> and the like, glycidyl esters such as > glycidyl acetate,
> glycidyl propionate,
> glycidyl pivalate,
> glycidyl methacrylate,
> glycidyl acrylate,
> and the like, alkyl glycidates such as > methyl glycidate,
> ethyl glycidate,
> and the like.

Exemplary of the oxetanes are oxetane (also known as trimethylene oxide),
2-methyl oxetane,
2-ethyl oxetane,
2-butyl oxetane,
2-octyl oxetane,
2-cyclohexyl oxetane,
2-methoxy oxetane,
2-ethoxy oxetane,
2-propoxy oxetane,
2-hexoxy oxetane,
2-methoxymethyl oxetane,
2-butoxymethyl oxetane,
2-benzyl oxetane,
2-phenoxy oxetane,
2-benzyloxymethyl oxetane,
2-allyl oxetane,
2-vinylbenzene oxetane,
2,2-dimethyl oxetane,
2-methoxy-2-methyl oxetane,
2-methallyl-2-methyl oxetane,
2-methyl-3-methyl oxetane,
3-methyl oxetane,
3-butyl oxetane,
3-octyl oxetane,
3-cyclohexyl oxetane,
3-phenyl oxetane,
3-allyl oxetane,
3-methoxy oxetane,
3-hexoxy oxetane,
3-methoxymethyl oxetane,
3-decoxymethyl oxetane,
3,3-dimethyl oxetane,
3,3-diisopropyl oxetane,
3,3-dioctyl oxetane,
3-methoxy-3-methyl oxetane,
3-ethoxymethyl-3-methyl oxetane,
3,3-bis(phenoxymethyl) oxetane,
3-vinyl-3-methyl oxetane,
3,3-bis(allyl) oxetane,
2-methyl-3-methyl-4-methyl oxetane,
2-methyl-4-methyl oxetane,
and the like.

Exemplary of the furans are the tetrahydrofurans such as

> tetrahydrofuran,
> 2-methyltetrahydrofuran,
> 2,3,4-trimethyltetrahydrofuran,
> and the like.

The cyclic esters which are copolymerizable by a cationic mechanism with a cis-1,4-dihalo-2,3-epoxybutane in accordance with this invention are lactones having 4 to 7 members in the ring, such as, for example, $\beta$-propiolactone, $\beta$-butyrolactone, $\gamma$-butyrolactone, pivalolactone, $\gamma$-valerolactone, $\gamma$-caprolactone, $\epsilon$-caprolactone and the like.

The 2-oxazolines which are copolymerizable by a cationic mechanism with a cis-1,4-dihalo-2,3-epoxybutane in accordance with this invention are compounds of the formula $$\begin{array}{c} H_2C\!-\!\!-\!\!-\!N \\ | \qquad \| \\ R^4HC \quad C\!-\!R^3 \\ \diagdown\!\!\diagup \\ O \end{array}$$

where $R^3$ is hydrogen, alkyl, aryl, alkaryl or cycloalkyl and $R^4$ is hydrogen or alkyl. Preferably the 2-oxazolines are compounds wherein $R^3$ is an alkyl group containing 1 to 10 carbons, phenyl, biphenyl, an alkaryl group containing 7 to 20 carbon atoms, or a cycloalkyl group containing 6 to 12 carbon atoms and $R^4$ is hydrogen or an alkyl group containing 1 to 10 carbon atoms. Typically the 2-oxazolines are 2-methyl-2-oxazoline, 2-ethyl-2-oxazoline, 2-isobutyl-2-oxazoline, 2-dodecyl-2-oxazoline, 2-octadecyl-2-oxazoline, 2-phenyl-2-oxazoline, 2-cyclohexyl-2-oxazoline, 2-p-methylphenyl-2-oxazoline, 2-ethyl-5-methyl-2-oxazoline, 2,5-dimethyl-2-oxazoline, 2-methyl-5-octyl-2-oxazoline, 2-phenyl-5-methyl-2-oxazoline, and the like.

The copolymers of this invention contain from about 99.5 to about 85% of a cis-1,4-dihalo-2,3-epoxybutane and from about 0.5 to about 15% of at least one halogen-free comonomer. Preferably, the copolymer contains from about 1 to about 10% of comonomer(s).

The new copolymers of this invention are characterized as being generally hard, tough, high melting, partially crystalline solids. These copolymers are of the random or block type and are further characterized by having an X-ray pattern similar or related to that of the racemic diisotactic parent homopolymer and by having melting points of at least about 150° C. and preferably at least about 180° C.

The crystalline copolymers of this invention find use in plastics and coatings, as well as wax applications. Thus, for example, the high molecular weight copolymers are useful for preparing a wide variety of improved plastic articles, films, fibers and foams by compression molding, injection molding, extrusion, vacuum forming, blow molding and the like with or without subsequent orientation by drawing. A particular advantage of these partially crystalline copolymers over the homopolymers of cis-1,4-dihalo-2,3-epoxybutanes is in preparation of fibers, monofilaments and oriented films since they can be drawn more readily to induce the orientation contributing increased strength. This property is probably a result of the somewhat lower crystallinity, but more importantly due to the lower rate of crystallization before or during the orientation process. These products are particularly useful in such applications because of their flame-retardant properties. In the coatings area the copolymers are particularly useful as powder coatings.

The lower molecular weight copolymers are useful as additives for plastics, elastomers, waxes, protective coatings, etc., to decrease inflammability and improve solvent resistance. These new copolymers can also be cross-linked with diamines, alone or in combination with other similarly vulcanizable polymers such as polyepichlorohydrin, polychloroprene, etc. As cross-linked compositions, these products have improved high temperature properties and better solvent resistance than products which have not been cross-linked.

The copolymers of this invention are still further characterized by being generally insoluble in water, aliphatic hydrocarbons, aromatic hydrocarbons and chlorinated solvents but generally soluble in cyclohexanone and dimethyl formamide at or above about 50° C. The preferred copolymers are high molecular weight, substantially linear polyethers which preferably have a Reduced Specific Viscosity (RSV) of at least about 0.4 and more preferably of at least about 0.5 when measured as a 0.1% or 0.2% solution in dimethyl formamide at 50° C. The copolymers are partially crystalline in an unoriented state, exhibiting a crystallinity of at least about 5% and preferably at least 10% as determined by differential scanning calorimetry.

The copolymers of this invention can be prepared by contacting a mixture of the cis-1,4-dihalo-2,3-epoxybutane and the comonomer or comonomers with an aluminum alkyl as catalyst. Any aluminum alkyl can be used as, for example, a trialkylaluminum, a dialkylaluminum halide, a dialkylaluminum hydride, an alkylaluminum dihydride, etc. The alkylaluminum compound can be used as such or it can be complexed with water within specified molar ranges. When water is used, the amount will usually be within the range of 0.5 to 1 mole of water per mole of alkylaluminum compound but a ratio of from about 0.1:1 to about 2:1 can be used. The alkyl group of the alkylaluminum compound can be any alkyl as, for example, methyl, ethyl, isopropyl, butyl, isobutyl, hexyl, octyl, etc.

The copolymerization reaction can be carried out in bulk but generally is carried out in a solution or suspension in an inert organic diluent or combination of diluents which are liquids at reaction temperature and have appreciable dissolving power for the cis-1,4-dihalo-2,3-epoxybutane at reaction temperature. Exemplary of diluents that can be used are the halogenated hydrocarbons such as methylene chloride, 1,1-dichloroethane, tetrafluoromethane, trifluoromethane, dichlorofluoromethane, 1,1-difluoroethane, 1,1-difluoro-1-chloroethane, chlorobenzene, etc., or a hydrocarbon diluent such as n-heptane, cyclohexane, etc., or combinations of such diluents.

The polymerization reaction can be carried out at any desired temperature and pressure. Usually, atmospheric or autogeneous pressure will be used and a temperature of from about −150° C. to about 0° C. and preferably from about −100° C. to about −30° C. Preferably the temperature is −80° C. to −70° C. and the preferred catalyst is triisobutyl aluminum which has been reacted with about 0.7 mole of water per mole of aluminum in an aliphatic hydrocarbon diluent.

The following examples illustrate the preparation of the new copolymers of this invention. All parts and percentages are by weight unless otherwise indicated. The molecular weight of the copolymers is shown by their Reduced Specific Viscosity (RSV). By the term Reduced Specific Viscosity is meant the $\eta_{sp.}/c$. determined on a 0.1% or 0.2% solution of the polymer in dimethyl formamide at 50° C., essentially equivalent results being obtained at either dilution. The melting point of the copolymer is determined by differential thermal analysis (DTA) or by differential scanning calorimetry (DSC) and is the temperature at which the last crystallinity disappears. The percent crystallinity was also determined by differential scanning calorimetry (DSC), using a Perkin-Elmer Differential Scanning Calorimeter (Model 1 B). With this instrument the heat of fusion per unit weight on melting the polymer sample, $\Delta H_f$, cal./g., is measured. Then, knowing the heat of fusion for 100% crystalline polymer, $\Delta H_f^0$, cal./g., the percent crystallinity of the sample is $$\frac{\Delta H_f}{\Delta H_f^0} \times 100$$

The crystallinity of the copolymers of this invention is due solely ot the cis-1,4-dihalo-2,3-epoxybutane units present in the copolymer. The $\Delta H_f^0$'s were determined for crystalline homopolymer by Flory's indirect method [P. J. Flory, J. Chem. Physics, 10, 51 (1942)] from measurements of melting point, $T_m$, as a function of diluent volume fraction, $\phi$, for a given polymer-diluent pair, using the relationship derived by Flory:

$$\frac{1/T_m - 1/T_m^0}{\phi} = \frac{R}{\Delta H_u} \frac{V_u}{V_1} \left(1 - \frac{BV_1\phi}{RT_m}\right)$$

where $T_m^0$ and $T_m$ are the melting temperatures of the pure polymer and the polymer-diluent mixtures; $\Delta H_u$ is the enthalpy of fusion per repeating unit of 100% crystalline polymer; R is the gas constant; $V_u/V_1$ is the ratio of molar volumes of the polymer repeating unit and the diluent; and B is a diluent-polymer interaction constant. By plotting $(1/T_m - 1/T_m^0)/\phi$ versus $\phi/T_m$, a straight line is obtained with an intercept at $$\frac{\phi}{T_m} = 0$$

of $RV_u/H_uV_1$. The value of $\Delta H_u$ is obtained immediately since $V_u$ and $V_1$ are known from density and molecular weight data. The $\Delta H_f^0$, cal./g., can be calculated from $\Delta H_u$ and the molecular weight of the polymer repeating unit. The $\Delta H_f^0$ for crystalline poly(cis-1,4-dichloro-2,3-epoxybutane) was determined to be 30.4 cal./g.

Crystallization half-time is also determined by differential scanning calorimetry. In this determination, the polymer is heated to 260° C., the temperature maintained thereat for 3 minutes, and then reduced rapidly to 160° C. in 1 minute, and the time to crystallization peak measured.

EXAMPLE 1

A polymerization vessel from which the air had been removed and replaced with nitrogen was charged with 32 parts of dry methylene chloride, 4.75 parts of cis-1,4-dichloro-2,3-epoxybutane and 0.25 part of 1,2-epoxy-4-decyne. The temperature of the charge was reduced using dry ice in the surrounding bath and, when the temperature reached −78° C., 0.83 part of a triisobutylaluminum-water catalyst was added. After 1.0 hour and 1.3 hours, respectively, two additional portions of 0.83 part of the catalyst were added, the reaction temperature being maintained at −78° C. The catalyst used in this example was a 0.87M solution of triisobutylaluminum which had been reacted with 0.7 mole of water per mole of aluminum. The catalyst was prepared by diluting commercial triisobutylaluminum with n-heptane to a 0.87M concentration, adding 0.7 mole of water per mole of aluminum dropwise with agitation over a period of 3.5 hours at 0° C., permitting the temperature to rise over 4 hours to 25° C., and then letting the mixture stand at 25° C. for at least 24 hours.

After 17 hours of polymerization at −78° C., the reaction was terminated by adding 2 parts of anhydrous ethanol. The reaction mixture was diluted with methylene chloride to a handleable viscosity, stirred once for 1 hour with 3% aqueous hydrogen chloride and then once for 2 hours with 10% aqueous hydrogen chloride. After washing neutral with water, the methylene chloride insoluble polymer was collected by filtration, washed twice with methylene chloride and once with a 0.4% solution of Santonox (4,4'-thiobis-(3-methyl-6-tert-butyl phenol)) in anhydrous ethanol and dried under vacuum for 16 hours at 80° C. The product was 1.57 parts (31% conversion) of white powdery, crystalline copolymer having an RSV of 1.1 and a melting point of 226° C. Elemental analysis gave 45.84% chlorine, indicating that the copolymer contained by weight 91.3% of cis-1,4-dichloro-2,3-epoxybutane. A Kemp bromine number indicated that the copolymer contained 6.2 weight percent of 1,2-epoxy-4-decyne. By DSC the product was found to have a heat of fusion of 6.5 cal./g. and a crystallinity of 21.5%. The crystallization half-time was greater than that of poly-(cis-1,4-dichloro-2,3-epoxybutane) prepared in the same manner.

The copolymer of this example was spun into monofilament at 270° C. and subsequently drawn over a hot pin at 130° C. The copolymer could be drawn to a greater degree, about 4X, and gave a higher strength after orientation, compared with a homopolymer of the same molecular weight.

The methylene chloride-soluble polymer was recovered from the filtrate and washings by adding to the filtrate 0.5 part of a 0.5% solution of Santonox, striping off the solvent and drying the residue under vacuum for 16 hours at 80° C. The product was 0.23 part of an adhering film (4.6% conversion) and had an RSV of 0.22.

EXAMPLE 2

The procedure of Example 1 was repeated except that 0.25 part of dry β-butyrolactone was substituted for 0.25 part of 1,2-epoxy-4-decyne, no additional catalyst was added at 1.3 hours and the polymerization time was 5 hours. The methylene chloride insoluble product of this example was 4.3 parts (86% conversion) of a white powdery, crystalline polymer having an RSV of 1.70 and a melting point of 230° C. Elemental analysis gave 48.75% chlorine, indicating that the product was a copolymer containing by weight 96.9% of cis-1,4-dichloro-2,3-epoxybutane and 3.1% of β-butyrolactone. By DSC the copolymer was found to have a heat of fusion of 8.0 cal./g. and a crystallinity of 26%.

EXAMPLE 3

The general procedure of Example 1 was repeated with the following exceptions: the monomer charge was 9.8 parts of cis-1,4-dichloro-2,3-epoxybutane and 0.20 part of 5,6-epoxy-1,3-dioxepane; 133 parts of methylene chloride was used; the catalyst was a 4.4M solution of triisobutylaluminum which had been reacted with 0.67 mole of water per mole of aluminum; the catalyst was added in equal increments of 0.39 part at 0, 1, 2, 3 and 4 hours of polymerization time; the total polymerization time was 21 hours; the reaction was terminated with 4 parts of anhydrous ethanol; the reaction mixture was stirred twice, rather than once, for 2 hours with 10% aqueous hydrogen chloride; and the isolated polymer was washed twice with methylene chloride and once with 0.2% Santonox in anhydrous ethanol. The catalyst used in this example was prepared by diluting commercial triisobutylaluminum with n-heptane to a 0.5M concentration, adding 0.67 mole of water per mole of aluminum dropwise with agitation over a perid of 3.5 hours at 0° C., permitting the temperature to rise over 4 hours to 25° C., letting the mixture stand at 25° C. for at least 24 hours and then vacuum distilling off sufficient heptane at 50° C. to give a catalyst concentration of 4.4M with respect to aluminum.

The methylene chloride insoluble polymer of this example was obtained in 79% conversion and was a crystalline copolymer having an RSV of 0.88 and a melting point of 231° C. By DSC the copolymer was found to have a heat of fusion of 7.3 cal./g. and a crystallinity of 24%. The copolymer contained by weight 98% of cis-1,4-dichloro-2,3-epoxybutane and 2% of 5,6-epoxy-1,3-dioxepane. The crystallization half-time was greater than that of poly(cis-1,4-dichloro-2,3-epoxybutane) prepared in the same manner.

EXAMPLE 4

The procedure of Example 3 was repeated except that the monomer charge was 9.5 parts of cis-1,4-dichloro-2,3-epoxybutane and 0.5 part of 5,6-epoxy-1,3-dioxepane, increments of catalyst were added at 0, 1, 2 and 3 hours, and the total polymerization time was 5 hours. The methylene chloride insoluble polymer was obtained in 73% conversion and was a crystalline copolymer having an RSV of 0.98 and a melting point of 230° C. by DSC the copolymer was found to have a heat of fusion of 2.3 cal./g. and a crystallinity of 7.5%. The product contained about 94% by weight of cis-1,4-dichloro-2,3-epoxybutane and 6% of 5,6-epoxy-1,3-dioxepane.

EXAMPLE 5

The procedure of Example 3 was repeated except that the monomer charge was 9.8 parts of cis-1,4-dichloro-2,3-epoxybutane and 0.20 part of 2-methyl-2-oxazoline, equal increments of catalyst were added at 0, 1 and 2 hours and double increments were added at 3 and 20 hours, and the total polymerization time was 28 hours. Methylene chloride insoluble polymer was obtained in 24% conversion and the polymer was a crystalline copolymer having an RSV of 1.55 and a melting point of 232° C. The copolymer had a chlorine content of 49.58% and contained by weight 98.6% of cis-1,4-dichloro-2,3-epoxybutane and 1.4% of 2-methyl-2-oxazoline. By DSC the copolymer was found to have a heat of fusion of 9.3 cal./g. and a crystallinity of about 30%. The crystallization half-time was greater than that of poly(cis-1,4-dichloro-2,3-epoxybutane) prepared in the same manner.

EXAMPLE 6

The procedure of Example 3 was repeated except that the monomer charge was 9.5 parts of cis-1,4-dichloro-2,3-epoxybutane and 1.34 parts of isobutylene, 0.39 part of catalyst was added initially and no additional catalyst was added, and the total polymerization time was 5.8 hours. Methylene chloride insoluble polymer was obtained in 61% conversion and the polymer was a crystalline copolymer having an RSV of 1.96 and a melting point of 231° C. The copolymer had a chlorine content of 47.05% and contained by weight 93.3% of cis-1,4-dichloro-2,3-epoxybutane and 6.7% of isobutylene. By DSC the copolymer was found to have a heat of fusion of 9.2 cal./g. and a crystallinity of about 30%.

EXAMPLE 7

The procedure of Example 5 was repeated except that the monomer charge was 9.5 parts of cis-1,4-dichloro-2,3-epoxybutane and 0.5 part of vinyl methyl ether. Methylene chloride insoluble polymer was obtained in 12% conversion and was a white powdery crystalline copolymer having an RSV of 0.43 and a melting point of 238° C. The copolymer had a chlorine content of 48.43% and contained, by weight, 96.2% of cis-1,4-dichloro-2,3-epoxybutane and 3.8% of vinyl methyl ether. By DSC the copolymer was found to have a heat of fusion of 10.2 cal./g. and a crystallinity of about 34%. The crystallization half-time was greater than that of poly(cis-1,4-dichloro-2,3-epoxybutane) prepared in the same manner.

What I claim and desire to protect by Letters Patent is:

1. A crystalline copolymer of a cis-1,4-dihalo-2,3-epoxybutane and from about 0.5 to about 15 weight percent of at least one halogen-free monomer which is copolymerizable with said epoxybutane by a cationic mechanism and which is a cyclic oxide containing from 3 to 5 members in the ring.

2. The copolymer of claim 1 wherein said epoxybutane is cis-1,4-dichloro-2,3-epoxybutane.

3. The copolymer of claim 2 wherein the amount of said halogen-free monomer is from about 1 to about 10%.

4. The copolymer of claim 3 wherein said halogen-free monomer is 1,2-epoxy-4-decyne.

5. The copolymer of claim 3 wherein said halogen-free monomer is 5,6-epoxy-1,3-dioxepane.

References Cited

UNITED STATES PATENTS 3,065,188  11/1962  Vandenberg _____ 260—2
3,251,852  5/1966  De Groote et al. ____ 260—309.6
3,341,475  9/1967  Vandenberg _____ 260—2

HAROLD D. ANDERSON, Primary Examiner

E. A. NIELSEN, Assistant Examiner

U.S. Cl. X.R.

260—2 BP, 2 XA, 88.3 A